United States Patent
Hasunuma

(10) Patent No.: US 9,816,621 B2
(45) Date of Patent: Nov. 14, 2017

(54) SHUT-OFF VALVE

(71) Applicant: Surpass Industry Co., Ltd., Gyoda-shi, Saitama (JP)

(72) Inventor: Masahiro Hasunuma, Gyoda (JP)

(73) Assignee: Surpass Industry Co., Ltd., Gyoda-shi, Saitama (JP)

( * ) Notice: Subject to any disclaimer, the term of this patent is extended or adjusted under 35 U.S.C. 154(b) by 6 days.

(21) Appl. No.: 14/702,797

(22) Filed: May 4, 2015

(65) Prior Publication Data

US 2015/0323081 A1 Nov. 12, 2015

(30) Foreign Application Priority Data

May 9, 2014 (JP) .................................. 2014-097623

(51) Int. Cl.
| | |
|---|---|
| *F16K 1/24* | (2006.01) |
| *F16K 21/02* | (2006.01) |
| *F16K 27/02* | (2006.01) |
| *F16K 7/16* | (2006.01) |
| *F16K 1/42* | (2006.01) |
| *F16K 7/14* | (2006.01) |

(52) U.S. Cl.
CPC .................. *F16K 1/24* (2013.01); *F16K 1/42* (2013.01); *F16K 7/14* (2013.01); *F16K 7/16* (2013.01); *F16K 21/02* (2013.01); *F16K 27/0236* (2013.01)

(58) Field of Classification Search
CPC ..... F16K 1/24; F16K 1/42; F16K 7/14; F16K 7/16; F16K 7/20; F16K 21/02; F16K 27/0236

USPC ................................. 251/331, 333–334, 359
See application file for complete search history.

(56) References Cited

U.S. PATENT DOCUMENTS

| | | | |
|---|---|---|---|
| 2,110,481 A | 3/1938 | Crocker | |
| 4,124,195 A | 11/1978 | Braun et al. | |
| 4,596,268 A * | 6/1986 | Jonas | F16K 7/126 137/375 |

(Continued)

FOREIGN PATENT DOCUMENTS

| | | |
|---|---|---|
| CH | 481 333 A | 11/1969 |
| DE | 1 037 379 B | 8/1958 |

(Continued)

OTHER PUBLICATIONS

Extended European Search Report for European Application No. 15165477.9 dated Oct. 2, 2015.

*Primary Examiner* — Marina Tietjen
(74) *Attorney, Agent, or Firm* — Muncy, Geissler, Olds & Lowe, P.C.

(57) ABSTRACT

There is provided a shut-off valve including: a valve body part having a valve body surface; a valve seat part provided around an inlet, and having a valve seat surface disposed at a position opposite to the valve body surface; and a moving mechanism that is connected to the valve body part, and moves the valve body part in a direction of an axis to switch to either a shut-off state or a circulation state, wherein the valve seat part has an endless inner peripheral side projection and an endless outer peripheral side projection that project from the valve seat surface toward the valve body surface along the axis, and the valve body part has a diaphragm forming the valve body surface, and an elastic member disposed on a back surface of the diaphragm.

7 Claims, 11 Drawing Sheets

(56) References Cited

U.S. PATENT DOCUMENTS

| | | | | |
|---|---|---|---|---|
| 5,131,627 | A | * 7/1992 | Kolenc | F16K 41/12 |
| | | | | 251/331 |
| 5,524,865 | A | 6/1996 | Uchisawa et al. | |
| 6,505,814 | B1 | * 1/2003 | Satou | F16K 7/123 |
| | | | | 137/863 |
| 7,389,969 | B2 | * 6/2008 | Masamura | F16K 7/14 |
| | | | | 251/331 |
| 7,537,194 | B2 | * 5/2009 | Nagai | F16K 1/38 |
| | | | | 251/122 |
| 2010/0229971 | A1 | 9/2010 | Igarashi | |

FOREIGN PATENT DOCUMENTS

| | | |
|---|---|---|
| EP | 2 696 120 A2 | 2/2014 |
| GB | 1 266 700 A | 3/1972 |
| JP | 2009-092192 A | 4/2009 |

* cited by examiner

SHUT-OFF VALVE

CROSS-REFERENCE TO RELATED APPLICATIONS

This application is based on Japanese Patent Application No. 2014-097623, the contents of which are incorporated herein by reference in its entirety.

TECHNICAL FIELD

The present disclosure relates to a shut-off valve.

BACKGROUND ART

Conventionally, a shut-off valve capable of switching between a circulation state where fluid flown in from an inlet is allowed to flow out from an outlet and a shut-off state where fluid flown in from the inlet is prevented from flowing out from the outlet has been known (e.g., see Japanese Unexamined Patent Application, Publication No. 2009-92192).

The shut-off valve disclosed in Japanese Unexamined Patent Application, Publication No. 2009-92192 switches between the circulation state and the shut-off state by bringing a valve body into contact with a valve seat, or separating the valve body from the valve seat.

SUMMARY

Technical Problem

In the shut-off valve described in PTL 1, in a case where the hardness of a member forming the valve seat and the hardness of a member forming the valve body are high, the members may be partially chipped when these valve seat and valve body are brought into contact with each other, and particles may be generated and mixed in fluid. Additionally, in a case where particles are mixed in the fluid flowing in from the inlet, the particles may be caught between the valve seat and the valve body, and shapes at a position where the particles may be deformed, so that a blocking property is impaired.

An object of the disclosure, which has been made in view of the aforementioned circumstances, is to provide a shut-off valve in which particles are prevented from being generated due to contact between a valve seat surface and a valve body surface, and a blocking property is prevented from being deteriorated by particles that are mixed in fluid caught between the valve seat surface and the valve body surface.

Solution to Problem

In order to solve the above problems, the present disclosure employs the following solutions.

A shut-off valve according to the present disclosure includes a valve body part that moves along an axis inside a valve chamber, and has a valve body surface formed on a plane orthogonal to the axis; a valve seat part provided around an inlet that allows fluid to flow in the valve chamber along the axis, and having a valve seat surface located at a position opposite to the valve body surface; and a moving mechanism that is connected to the valve body part, and moves the valve body part in a direction of the axis to switch to either a shut-off state where the valve body surface comes into contact with the valve seat surface, or a circulation state where the valve body surface separates from the valve seat surface, wherein the valve seat part has a plurality of endless projections that project from the valve seat surface toward the valve body surface along the axis, and are formed so as to surround the inlet, and the valve body part has a diaphragm forming the valve body surface, and an elastic member disposed on a back surface of the diaphragm.

In the shut-off valve according to the present disclosure, the valve body surface formed on the plane orthogonal to the axis, which is the moving direction of the valve body part, comes into contact with, or separates from the valve seat surface located at the position opposite to the valve body surface, by the moving mechanism. When the valve body surface approaches the valve seat surface by the moving mechanism, the diaphragm forming the valve body surface comes into contact with the projections projecting from the valve seat surface to the valve body surface. The projections each are an endless projection that projects from the valve seat surface to the valve body surface along the axis, and is formed so as to surround around the inlet allowing fluid to flow in the valve chamber. Therefore, the projections come into contact with the valve body surface, thereby blocking the inflow of the fluid from the flow passage to the valve chamber. Additionally, the elastic member is disposed on the back surface of the diaphragm, and therefore the diaphragm in contact with the projections deforms along the shapes of the projections together with the elastic member. Accordingly, the elastic member absorbs impact caused by the contact between the valve seat surface and the valve body surface, thereby preventing generation of particles.

The valve seat part has the plurality of endless projections that project from the valve seat surface to the valve body surface. Therefore, in the shut-off state, even in a case where particles are caught between any of the projections and the valve body surface, and the shape of the projection deforms, the inflow of the fluid from an inflow passage to the valve chamber is blocked by the contact between other projection and the valve body surface. Accordingly, it is possible to prevent deterioration of a blocking property due to particles caught between the valve seat surface and the valve body surface.

In a shut-off valve according to a first aspect of the present disclosure, a thickness of the diaphragm is larger than a height of each of the projections.

With such a configuration, even in a case where contact with and separation from the projections is repeated to deform the diaphragm, it is possible to suppress a risk that the projections break through and damage the diaphragm.

In a shut-off valve according to a second aspect of the present disclosure, the moving mechanism has: a piston part that is connected to the valve body part, and is movable in the direction of the axis together with the valve body part; a first urging force generation part that generates first urging force in the piston part, the first urging force being force in a direction in which the valve body surface approaches the valve seat surface; and a second urging force generation part that generates second urging force in the piston part, the second urging force being force in a direction in which the valve body surface moves away from the valve seat surface, and the valve body surface comes into contact with the valve seat surface to enter the shut-off state in a case where the first urging force exceeds the second urging force, and the valve body surface separates from the valve seat surface to enter the circulation state in a case where the second urging force exceeds the first urging force.

According to the shut-off valve of the second aspect of the present disclosure, the first urging force in the direction, in which the valve body surface approaches the valve seat surface, and the second urging force in the direction, in which the valve body surface moves away from the valve seat surface, generate in the piston part. In a case where the first urging force exceeds the second urging force, the valve body surface comes into contact with the valve seat surface to enter the shut-off state. In a case where the second urging force exceeds the first urging force, the valve body surface separates from the valve seat surface to enter the circulation state.

With such a configuration, the first urging force and the second urging force are regulated, so that the shut-off state and the circulation state can be suitably switched.

In the shut-off valve of the second aspect of the present disclosure, the first urging force generated by the first urging force generation part may be elastic force of a spring, the second urging force generated by the second urging force generation part may be pressure of compressed air, and the second urging force generation part may generate the second urging force exceeding the first urging force to switch the shut-off state to the circulation state, by increasing the pressure of the compressed air.

With such a configuration, a normally closed shut-off valve can be provided, in which in a normal state where pressure of compressed air is low, the first urging force exceeds the second urging force to enter the shut-off state, and the shut-off state is switched to the circulation state by increasing the pressure of the compressed air.

In the shut-off valve of the second aspect of the present disclosure, the first urging force generated by the first urging force generation part may be pressure of compressed air, the second urging force generated by the second urging force generation part may be elastic force of a spring, and the first urging force generation part may generate the first urging force exceeding the second urging force to switch the circulation state to the shut-off state, by increasing the pressure of the compressed air.

With such a configuration, a normally open shut-off valve can be provided, in which in a normal state where pressure of compressed air is low, the second urging force exceeds the first urging force to enter the circulation state, and the circulation state is switched to the shut-off state by increasing the pressure of the compressed air.

In the shut-off valve of the above second aspect, the valve body part has an intermediate member connected to the piston part, and the intermediate member is provided with an expanded diameter part, and a reduced diameter part whose radial width orthogonal to the axis is narrower than that of the expanded diameter part, in this order starting from a side of a tip in the direction of the axis. The diaphragm has a locking part that is in a state in contact with the reduced diameter part in a state where the elastic member is in contact with the valve body surface and the tip of the intermediate member. A periphery of the locking part is surrounded by a tip of the piston part.

With such a configuration, the presence of the tip of the piston part surrounding the periphery of the locking part restricts the deformation of the locking part, which is in contact with the reduced diameter part formed in the intermediate member, in the radial direction orthogonal to the axis. Therefore, inconvenience in that the intermediate member comes off the diaphragm is prevented.

In the shut-off valve of any of the above may include flow regulating mechanism that regulates a flow rate of fluid in the circulation state. With such a configuration, a shut-off valve capable of regulating a flow rate of fluid in the circulation state can be provided.

According to the present disclosure, a shut-off valve can be provided, in which particles are prevented from being generated by contact between a valve seat surface and a valve body surface, and a blocking property is prevented from being deteriorated by particles that are mixed in fluid caught between the valve seat surface and the valve body surface.

BRIEF DESCRIPTION OF DRAWINGS

FIG. 7 is a set of figures showing the shut-off valve of the first embodiment, in which

FIG. 11 is a set of figures showing the shut-off valve of the third embodiment, in which

DESCRIPTION OF EMBODIMENTS

First Embodiment

Hereinafter, a shut-off valve 100 of a first embodiment of the present disclosure is described with reference to the drawings. The shut-off valve 100 of this embodiment is an apparatus that is installed in a pipe for circulating fluid (liquid such as chemical liquid and pure water) used in a semiconductor manufacturing apparatus or the like.

Figure 1:
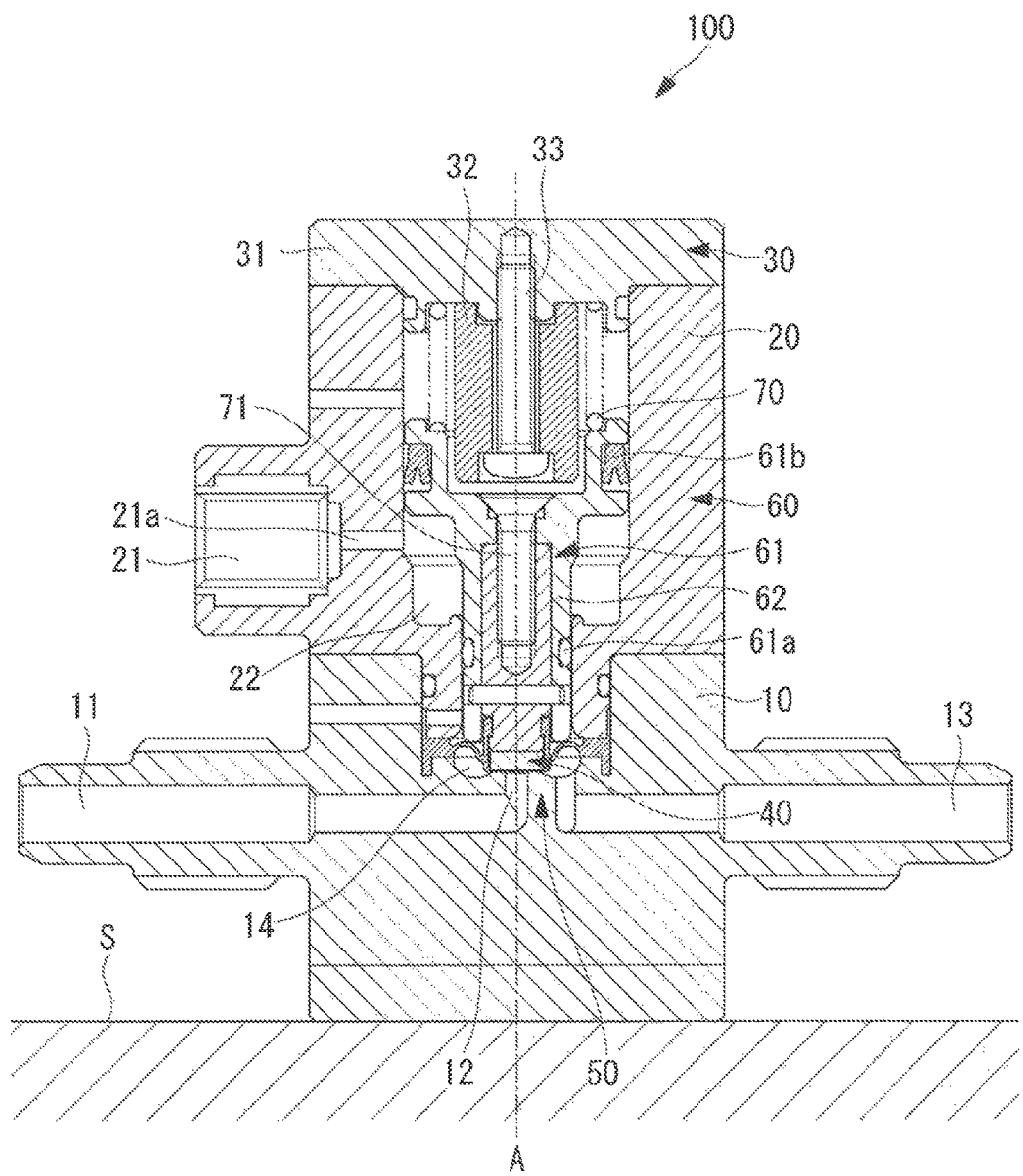
FIG. 1 is a longitudinal section view showing a shut-off state of a shut-off valve according to a first embodiment.

As shown in FIG. 1, the shut-off valve 100 includes a lower housing 10, an upper housing 20, a cover part 30, a valve body part 40, a valve seat part 50, and a moving mechanism 60. Hereinafter, each of configurations that the shut-off valve 100 has is described in detail.

The lower housing 10 is a member made of fluorocarbon resin (e.g., PTFE (polytetrafluoroethylene)), and is provided with an inflow passage 11, an introduction flow passage 12, and an outflow passage 13 therein. The lower housing 10 is fixed to an installation surface S by a fastening bolt (not shown).

The inflow passage 11 is a flow passage for guiding fluid flown in from an upstream pipe (not shown) to the inside of the shut-off valve 100. The introduction flow passage 12 is a flow passage for changing the circulation direction of the fluid flown in the shut-off valve 100 along an axis parallel to the installation surface S, to a direction along the axis A, and guiding the fluid inside a valve chamber 14. The outflow passage 13 is a flow passage for guiding fluid flown out from the valve chamber 14 to a downstream pipe (not shown) along the axis parallel to the installation surface S.

The upper housing 20 is a member made of fluorocarbon resin (e.g., PVDF (polyvinylidene fluoride) or PP (polypropylene)), and a cylindrical member extending along the axis A. The upper housing 20 houses a moving member 61 movable along the axis A. The upper housing 20 is provided with an operation port 21. To the operation port 21, compressed air is supplied from a compressed air supply source (not shown). The compressed air supplied to the operation port 21 is introduced in a pressure chamber 22 through an introduction flow passage 21a.

The cover part 30 includes a cover 31, a core part 32, and a fastening screw 33 that connects the core part 32 and the cover 31. The cover 31 and the core part 32 are members made of fluorocarbon resin (e.g., PVDF (polyvinylidene fluoride) or PP (polypropylene)). The outer peripheral surface of the lower end along the axis A of the cover 31 is connected to the inner peripheral surface of the upper end along the axis A of the upper housing 20.

Figure 6:
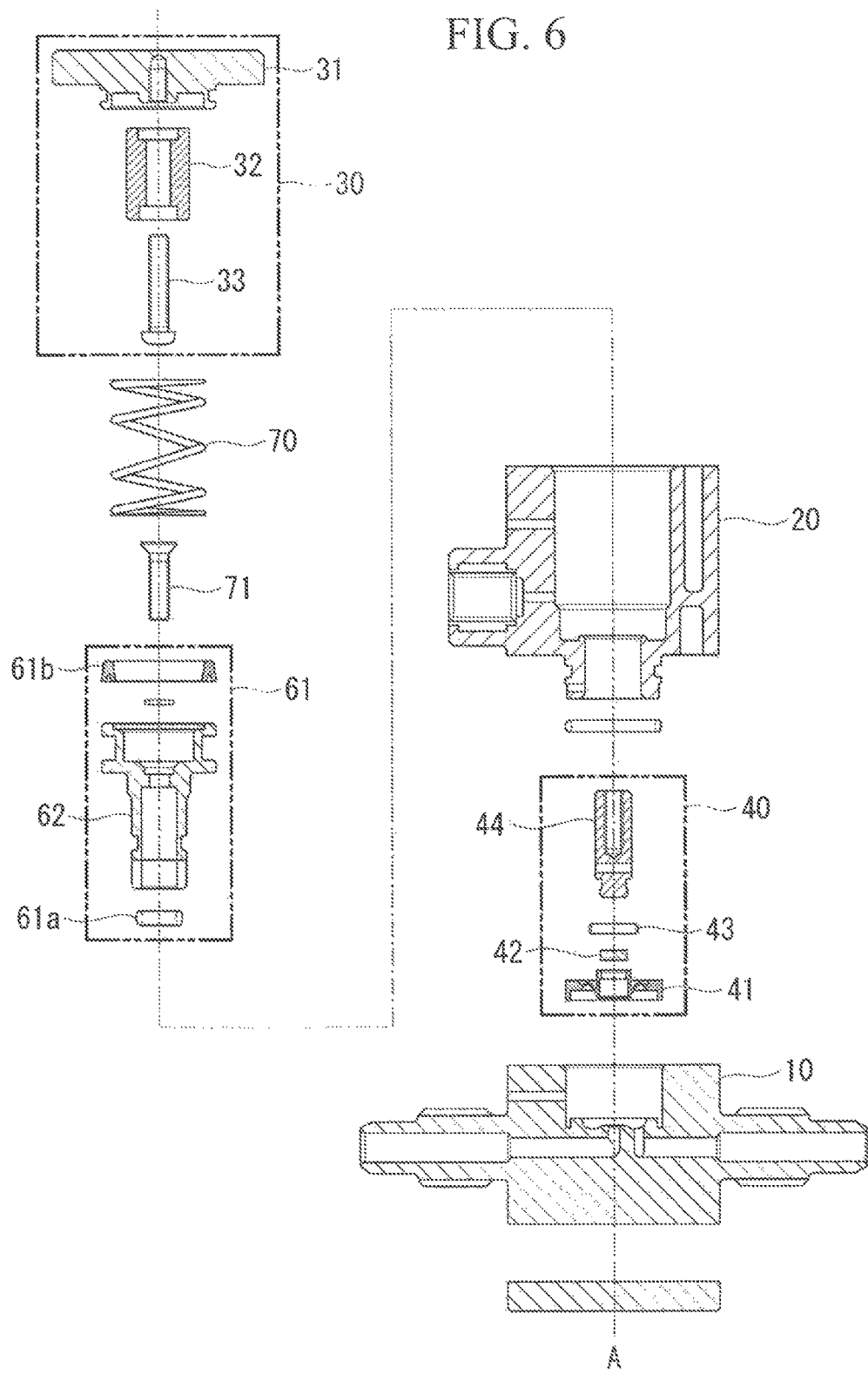
FIG. 6 is an exploded view of the shut-off valve shown in FIG. 1.

The valve body part 40 is a member that moves along the axis A inside the valve chamber 14. As shown in an exploded view of FIG. 6, the valve body part 40 includes a diaphragm 41, an elastic member 42, a pin member 43, and an intermediate member 44.

The diaphragm 41 is a thin-film like member made of fluorocarbon resin (e.g., PTFE). As shown in a partial enlarged view of FIG. 2, the diaphragm 41 is a member obtained by integrally molding a valve body surface 41a, a diaphragm part 41b, an annular projection 41c, and a locking part 41d. The diaphragm 41 is pressed in the downward direction of the axis A by the distal end surface of the upper housing 20, thereby fixing the position in the direction of the axis A.

Figure 2:
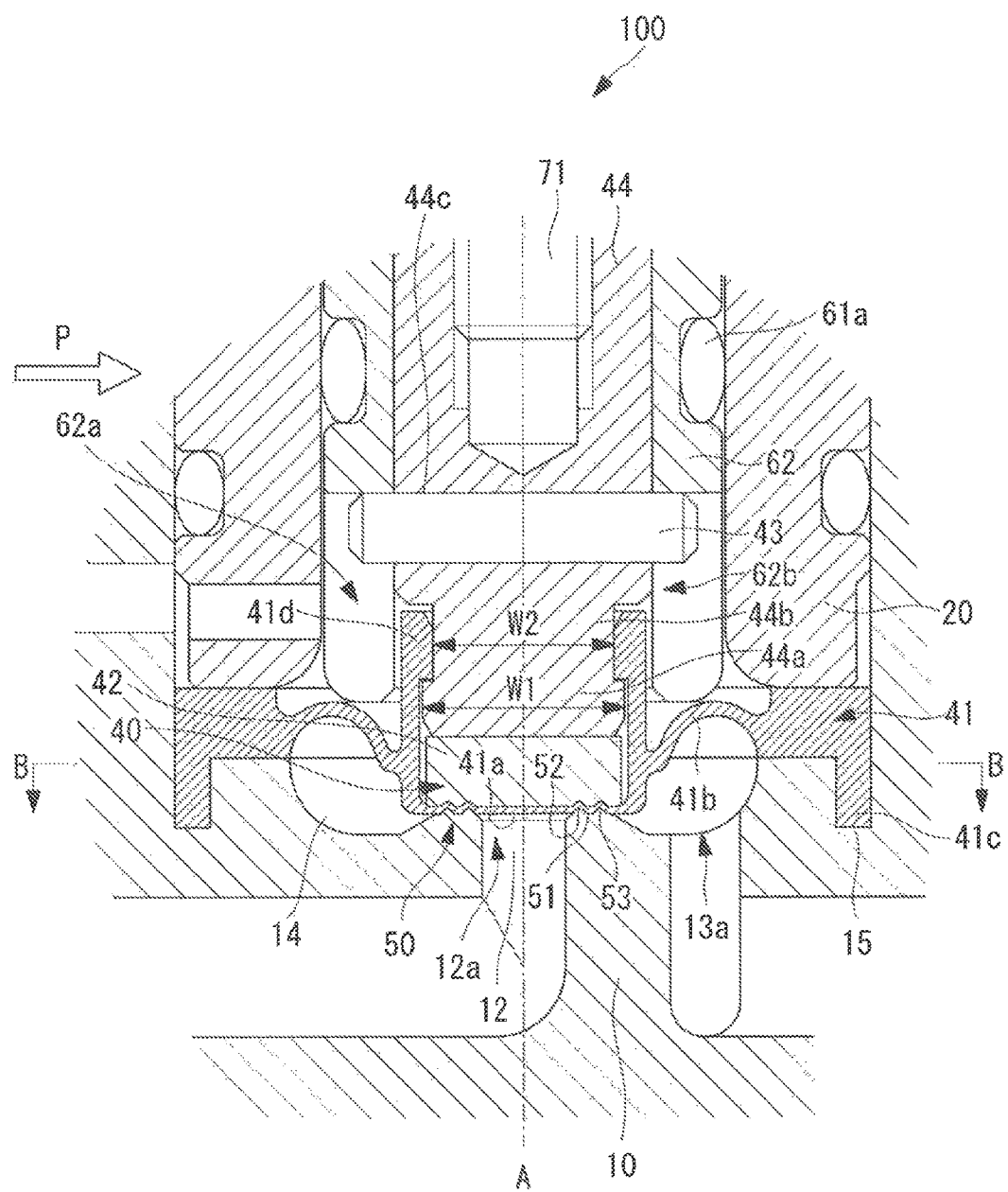
FIG. 2 is a partial enlarged view of the shut-off valve shown in FIG. 1.

As shown in FIG. 2, the valve body surface 41a formed by the diaphragm 41 is a surface formed on a plane orthogonal to the axis A, and is located at a position opposite to the valve seat part 50. The diaphragm part 41b is an annular thin-film like member in plan view, and is a member for isolating fluid in the valve chamber 14. The diaphragm part 41b is a member that deforms with the movement of the intermediate member 44 connected to the moving member 61 in the direction of the axis A.

The annular projection 41c is a member that extends in the peripheral direction around the axis A and projects downward along the axis A. The lower housing 10 opposite to the annular projection 41c is provided with an endless annular groove 15 that extends in the peripheral direction around the axis A. The annular projection 41c is inserted in the annular groove 15, thereby bringing the radial position of the axis A into a fixed state.

The locking part 41d is a member for fixing the intermediate member 44 such that the intermediate member 44 does not move along the axis A.

The elastic member 42 is a member disposed on the back surface of the valve body surface 41a of the diaphragm 41 in contact with the valve chamber 14, and is a member having a substantially circular shape in plan view along the axis A. The elastic member 42 supports the whole surface of the valve body surface 41a having a circular shape in plan view, from the back surface side.

The elastic member 42 is formed by a material having lower hardness than the lower housing 10 made of fluorocarbon resin, by which the valve seat part 50 is formed. As a member configuring the elastic member 42, a member having high chemical resistance (acid resistance and alkali resistance) is preferably used. For example, fluororubber or ethylene propylene rubber (EPDM) is used. The reason why the elastic member 42 is the member having high chemical resistance is that a part of fluid in the valve chamber 14 penetrates the diaphragm 41 as gas, and is guided to the vicinity of the elastic member 42. The bottom surface of the elastic member 42 is located in a state of being in contact with the back surface of the valve body surface 41a, and the upper surface of the elastic member 42 is located in a state of being in contact with the lower surface of the intermediate member 44.

The intermediate member 44 is a circular member that extends in the direction of the axis A, and is connected to a piston part 62 by a fastening screw 71. As shown in FIG. 2, the tip of the intermediate member 44 is provided with an expanded diameter part 44a whose radial length orthogonal to the axis A is W1, and a reduced diameter part 44b whose radial length is W2.

The locking part 41d of the diaphragm 41 is disposed in the reduced diameter part 44b so as to be in contact with the reduced diameter part 44b. An interval of the inner peripheral surface of the locking part 41d in contact with the reduced diameter part 44b coincides with the width W2 shown in FIG. 2, and is narrower than the width of the expanded diameter part 44a. Accordingly, in a state where the locking part 41d is in contact with the reduced diameter part 44b, shown in FIG. 2, the intermediate member 44 does not come off the diaphragm 41. Therefore, the diaphragm 41 moves in the direction of the axis A as the piston part 62 connected to the intermediate member 44 moves in the direction of the axis A.

As shown in FIG. 2, the pin member 43 is a columnar member inserted in a through hole 44c provided in the intermediate member 44. The through hole 44c extends in a direction orthogonal to the axis A. The both ends of the pin member 43 are arranged in a state of being sandwiched between grooves 62a and 62b provided in the piston part 62.

Figure 3:
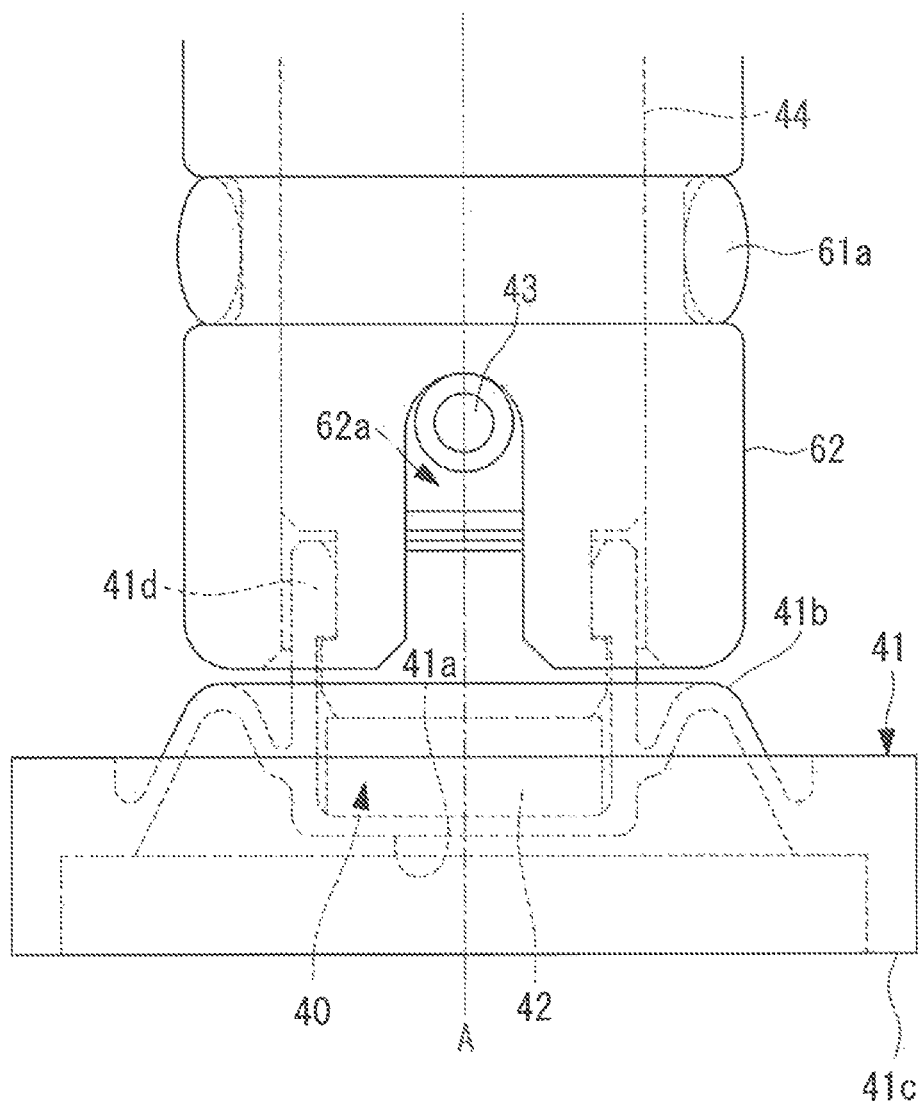
FIG. 3 is a diagram of a piston part as viewed from the P direction shown in FIG. 2.

As shown in FIG. 3, the groove 62a provided in the piston part 62 extends in the direction of the axis A, and a groove width in the direction orthogonal to the axis A is slightly larger than the pin member 43. Therefore, even when force in the direction of rotation around the axis A is applied to the intermediate member 44, the pin member 43 abuts on the groove 62a, to be restricted so as not to rotate around the axis A. FIG. 3 shows the groove 62a side, but the groove 62b side has a similar structure.

The valve body part 40 shown in FIG. 2 is in a state where the valve body surface 41a is in contact with a valve seat surface 51. On the other hand, the valve body part 40 shown in FIG. 3 is in a state where the valve body surface 41a is separated from the valve seat surface 51. In order to describe the piston part 62 and the pin member 43, FIG. 3 does not show the upper housing 20 and the lower housing 10 that are disposed around the piston part 62 and the pin member 43.

Accordingly, even in a case where the fastening screw 71 is rotated around the axis A when the intermediate member 44 is connected to the piston part 62 by the fastening screw 71, the intermediate member 44 does not rotate around the axis A. Therefore, it is possible to prevent inconvenience in that the intermediate member 44 rotates around the axis A, the diaphragm 41 rotates around the axis A with the rotation of the intermediate member 44, and the diaphragm part 41b is damaged.

Figure 4:
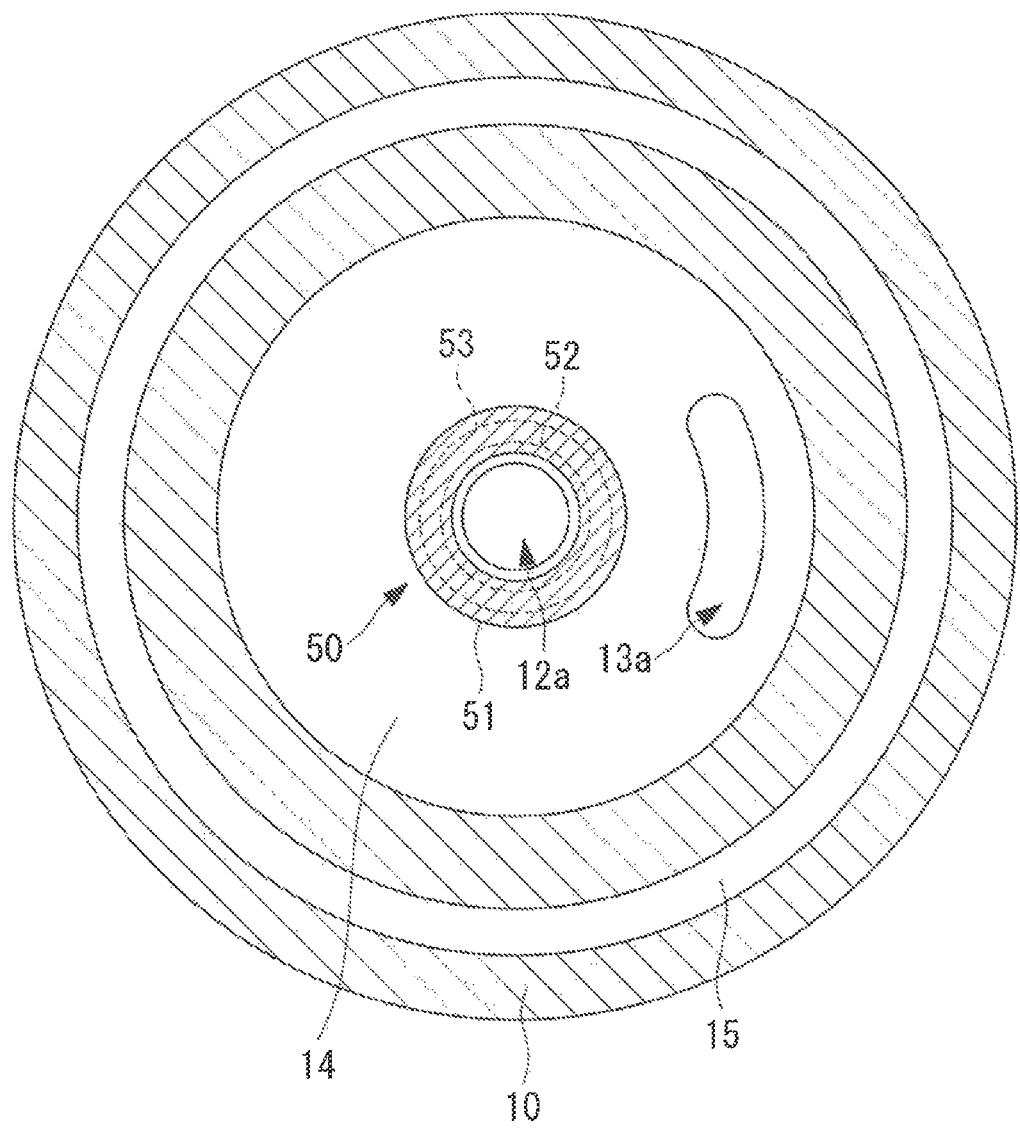
FIG. 4 is a sectional view taken along the arrow B-B of a lower housing shown in FIG. 2.

The valve seat part 50 is a member formed in the lower housing 10, and is provided around an inlet 12a allowing fluid to flow in the valve chamber 14 from the introduction flow passage 12 along the axis A. FIG. 4 is a sectional view taken along the arrow B-B of the lower housing 10 shown in FIG. 2, in which the lower housing 10 is planarly viewed along the axis A in a state where the diaphragm 41 is not installed. The fluid flowing in the valve chamber 14 from the inlet 12a is guided in the outflow passage 13 from an outlet 13a.

Figure 5:
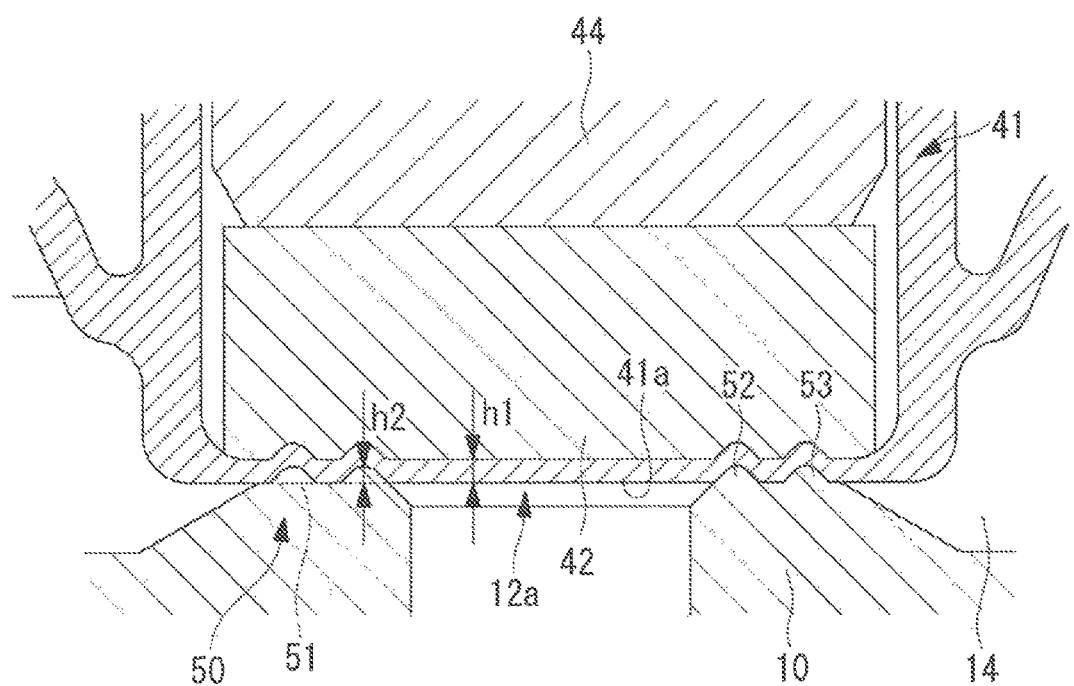
FIG. 5 is a partial enlarged view of the vicinity of a valve body part shown in FIG. 2.

As shown in FIG. 2, FIG. 4, and FIG. 5, the valve seat part 50 includes the valve seat surface 51, an inner peripheral side projection 52, and an outer peripheral side projection 53. The valve seat surface 51 is formed on a plane orthogonal to the axis A, and is located at a position opposite to the valve body surface 41a. An annular region provided around the inlet 12a in FIG. 4 shows the valve seat surface 51.

The inner peripheral side projection 52 and the outer peripheral side projection 53 are members that project from the valve seat surface 51 to the valve body surface 41a along the axis A, and are formed so as to surround the inlet 12a. The inner peripheral side projection 52 and the outer peripheral side projection 53 each are an endless member formed so as to surround the inlet 12a, and integrally provided with the valve seat surface 51 in the lower housing 10. At positions shown by broken lines in FIG. 4, the inner peripheral side projection 52 and the outer peripheral side projection 53 are formed. The broken lines in FIG. 4 each show a position of the top of each projection.

As shown in FIG. 5, the thickness h1 of the valve body surface 41a of the diaphragm 41 is larger than the height h2 of each of the inner peripheral side projection 52 and the outer peripheral side projection 53.

The moving mechanism 60 shown in FIG. 1 is a mechanism that is connected to the valve body part 40, and moves the valve body part 40 along the axis A to switch to either a shut-off state where the valve body surface 41a is in contact with the valve seat surface 51 or a circulation state where the valve body surface 41a separates from the valve seat surface 51. The moving mechanism 60 includes the piston part 62, a spring 70 (first urging force generation part), and a pressure chamber 22 (second urging force generation part).

As shown in FIG. 1, the piston part 62 is a substantially cylindrical member extending along the axis A, and connected to the valve body part 40 by the fastening screw 71. The piston part 62 is movable in the direction of the axis A together with the valve body part 40.

The spring 70 generates elastic force in a direction, in which the valve body surface 41a approaches the valve seat surface 51 (first urging force), in the piston part 62. The upper end in the direction of the axis A of the spring 70 is supported by the cover 31, and the lower end in the direction of the axis A of the spring 70 abuts on the upper end in the direction of the axis A of the piston part 62. Thus, the elastic force of the spring 70 is transmitted to the piston part 62.

The pressure chamber 22 generates pressure in a direction, in which the valve body surface 41a moves away from the valve seat surface 51 (second urging force), in the piston part 62. The pressure chamber 22 is a space defined by the piston part 62 and the upper housing 20. In the pressure chamber 22, compressed air is introduced from the operation port 21 through the introduction flow passage 21a.

As shown in FIG. 1, an O-ring 61a and a packing 61b are mounted in groove parts in the outer peripheral surface of the piston part 62. The O-ring 61a and the packing 61b are in contact with the inner peripheral surface of the upper housing 20, so that the compressed air introduced in the pressure chamber 22 is sealed.

Now, operation of switching between a circulation state where fluid is circulated and a shut-off state where circulation of the fluid is blocked, by the shut-off valve 100 of this embodiment is described.

The shut-off valve 100 of this embodiment is a normally closed shut-off valve. In a normal state where the pressure of the compressed air in the pressure chamber 22 is low, elastic force of the spring 70 exceeds the pressure of the compressed air, to enter the shut-off state shown in FIG. 1. On the other hand, the pressure of the compressed air in the pressure chamber 22 is increased, so that the shut-off state shown in FIG. 1 is switched to the circulation state shown in FIG. 8. The pressure of the compressed air in the pressure chamber 22 is regulated by the compressed air supply source (not shown) that introduces compressed air in the operation port 21.

Figure 8:
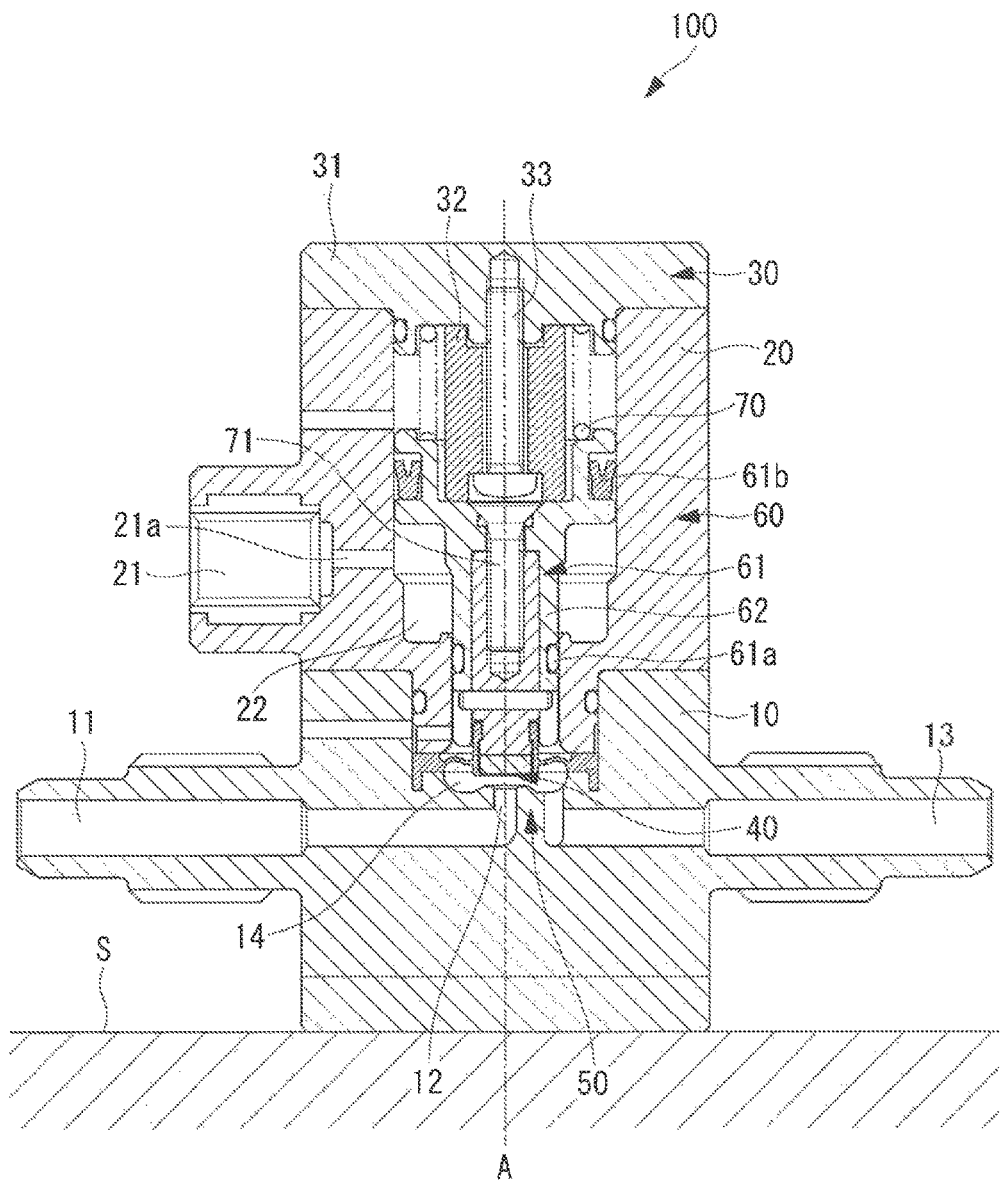
FIG. 8 is a longitudinal section view showing a circulation state of the shut-off valve of the first embodiment.

As shown in FIG. 5, in a case where the elastic force of the spring 70 exceeds the pressure of the compressed air, the shut-off valve is brought into the shut-off state where the valve body surface 41a comes into contact with the valve seat surface 51. In this shut-off state, inflow of fluid from the inlet 12a to the valve chamber 14 is blocked. On the other hand, in a case where the pressure of the compressed air exceeds the elastic force of the spring 70, the shut-off valve is brought into the circulation state where the valve body surface 41a separates from the valve seat surface 51, as shown in FIG. 8. In this circulation state, fluid flows in the valve chamber 14 from the inlet 12a.

In the shut-off state, the inner peripheral side projection 52 and the outer peripheral side projection 53 are in contact with the valve body surface 41a as shown in FIG. 5. Parts, in contact with the inner peripheral side projection 52 and the outer peripheral side projection 53, of the valve body surface 41a deform so as to coincide with the shapes of the respective projections. The inner peripheral side projection 52, the outer peripheral side projection 53, and the valve body surface 41a are the same member made of fluorocarbon resin, but the valve body surface 41a is in the form of a thin film. Therefore, the valve body surface 41a easily deforms in a direction along the axis A.

The elastic member 42 that supports the back surface of the valve body surface 41a is configured by a member having lower hardness than the lower housing 10 made of fluorocarbon resin. Therefore, as shown in FIG. 5, the elastic member 42 deforms in the direction along the axis A along the shape of the valve body surface 41a that deforms in the direction along the axis A. The hardness of the elastic member 42 is lower than the hardness of fluorocarbon resin, and therefore when the valve body surface 41a comes into contact with the valve seat surface 51, the inner peripheral side projection 52, and the outer peripheral side projection 53, the elastic member 42 absorbs impact due to the contact.

In a case where particles contained in fluid flowing in from the inlet 12a are caught between the valve body surface 41a and the inner peripheral side projection 52, stress generated in a contact portion between the valve body surface 41a and the inner peripheral side projection 52 locally increases due to the presence of the particles. In a case where the valve body part 40 and the valve seat part 50 are configured by materials having the same hardness, there is a possibility that a portion where stress locally increases due to the contact between the valve body part 40 and the valve seat part 50 deforms. When such deformation occurs, the blocking property of fluid in the deformed portion is impaired.

In this embodiment, the valve body part 40 includes the elastic member 42 having low hardness, and therefore even when particles are caught in the contact portion between the valve body surface 41a and the inner peripheral side projection 52, deformation due to locally increased stress is suppressed.

In the above description, particles are caught between the valve body surface 41a and the inner peripheral side projection 52. However, a similar effect produces also in a case where particles are caught between the valve body surface 41a and the outer peripheral side projection 53.

The valve seat part 50 of this embodiment includes the inner peripheral side projection 52 and the outer peripheral side projection 53. Therefore, even when particles are caught between the valve body surface 41a and the inner peripheral side projection 52, and the inner peripheral side projection 52 deforms, a blocking property is secured by the outer peripheral side projection 53. Similarly, even when particles are caught between the valve body surface 41a and the outer peripheral side projection 53, and the outer peripheral side projection 53 deforms, a blocking property is secured by the inner peripheral side projection 52.

Thus, the valve seat part 50 of this embodiment includes double projections in the inner periphery and the outer periphery, and therefore even when particles are caught and one of the projections deforms, the blocking property can be secured by the other projection.

Now, an assembly method of the shut-off valve 100 of this embodiment is described.

First, the valve body part 40 is mounted on the lower housing 10. At this time, the annular projection 41c of the diaphragm 41 is inserted in the annular groove 15 of the lower housing 10. Thereafter, the elastic member 42 is mounted so as to be in contact with the back surface of the valve body surface 41a of the diaphragm 41. After the elastic member 42 is mounted, the expanded diameter part 44a of the intermediate member 44 is inserted to reach such a position as to come into contact with the elastic member 42 while the locking part 41d of the diaphragm 41 deforms radially outward of the axis A.

As shown in FIG. 2, when the expanded diameter part 44a is inserted downward along the axis A, and passes through the locking part 41d, the reduced diameter part 44b of the intermediate member 44 is in contact with the locking part 41d of the diaphragm 41. Consequently, the tip of the intermediate member 44 is in contact with the elastic member 42, and the intermediate member 44 is integrated so as not to move relative to the diaphragm 41 along the axis A.

Then, the upper housing 20 is mounted on the lower housing 10. As shown in FIG. 2, when the upper housing 20 is mounted on the lower housing 10, the lower end of the upper housing 20 comes into contact with the diaphragm 41, and the annular projection 41c of the diaphragm 41 is inserted in the annular groove 15 by this contact.

The moving member 61 is mounted from above the cylindrical upper housing 20 along the axis A. At this time, the O-ring 61a and the packing 61b are mounted in the grooves provided in the outer peripheral surface of the piston part 62. Thereafter, the tip of the piston part 62 is inserted downward along the axis A such that the piston part 62 of the moving member 61 is disposed in a clearance between the intermediate member 44 and the upper housing 20. Thereafter, the piston part 62 of the moving member 61 is connected to the intermediate member 44 of the valve body part 40 by the fastening screw 71.

As shown in FIG. 2, when the tip of the piston part 62 is inserted downward along the axis A, the end of the pin member 43 inserted in the through hole 44c of the intermediate member 44 is inserted in the grooves 62a and 62b provided in the outer peripheral surface of the tip of the piston part 62. In the state shown in FIG. 2, the periphery of the locking part 41d of the diaphragm 41 is surrounded by the tip of the piston part 62. In this state, deformation of the locking part 41d in the radial direction of the axis A is restricted by the presence of the piston part 62. Therefore, inconvenience in that the intermediate member 44 comes off the diaphragm 41 is prevented.

The spring 70 is installed in the upper end of the moving member 61, and the cover part 30 is mounted on the upper part of the spring 70.

The cover part 30 is a member obtained by connecting the core part 32 to the cover 31 by the fastening screw 33. When the cover part 30 is mounted on the upper part of the spring 70, the core part 32 of the cover part 30 is inserted in a space provided at the center of the spring 70. The inner peripheral surface of the lower end of the cover 31 is inserted in the inner peripheral surface of the upper end of the upper housing 20, so that the cover part 30 is fixed to the upper housing 20. The cover part 30 is fixed to the upper housing 20, so that the upper end of the spring 70 is fixed to the cover 31, and the lower end of the spring 70 is fixed to the upper end of the moving member 61.

Figure 7A:
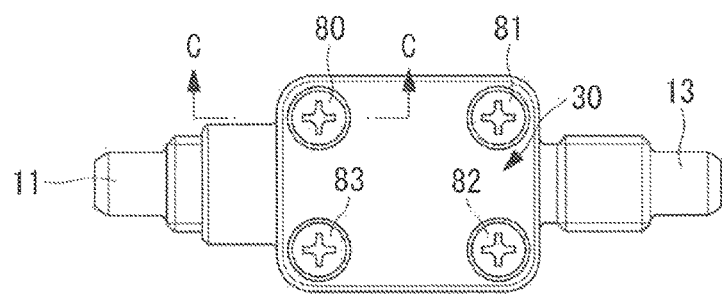
FIG. 7A is a plan view.
Figure 7B:
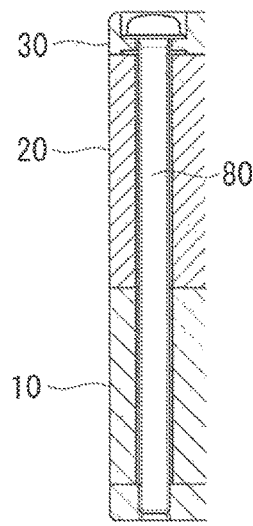
FIG. 7B is a sectional view taken along the arrow C-C of FIG. 7A.
Figure 7C:
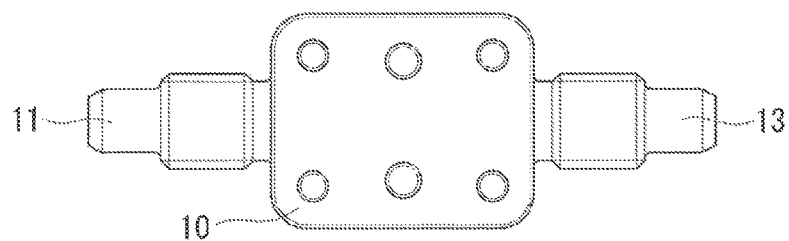
FIG. 7C is a rear view.

Finally, the lower housing 10, the upper housing 20, and the cover part 30 are connected. As shown in FIG. 7A and FIG. 7C, the lower housing 10, the upper housing 20, and the cover part 30 each are a substantially rectangular member in plan view, and are each provided with through holes extending in a direction parallel to the axis A at four corners. Female screws are formed in the respective inner peripheral surfaces of the through holes at the four corners.

Through bolts 80, 81, 82 and 83 are fastened to the through holes at the four corners. At this time, the female screws formed in the inner peripheral surfaces of the through holes are fastened to male screws formed in the outer peripheral surfaces of the through bolts. Consequently, as shown in FIG. 7B, the lower housing 10, the upper housing 20, and the cover part 30 are connected.

Thus, the shut-off valve 100 of this embodiment is assembled.

Action and effects exhibited by the above shut-off valve 100 of this embodiment are described.

According to the shut-off valve 100 of this embodiment, the valve body surface 41a formed on the plane orthogonal to the axis A, which is the moving direction of the valve body part 40, comes into contact with, or separates from the valve seat surface 51 located at the position opposite to the valve body surface 41a by the moving mechanism 60.

When the valve body surface 41a approaches the valve seat surface 51 by the moving mechanism 60, the diaphragm 41 forming the valve body surface 41a comes into contact with the inner peripheral side projection 52 and the outer peripheral side projection 53 that project from the valve seat surface 51 to the valve body surface 41a. The inner peripheral side projection 52 and the outer peripheral side projection 53 each are an endless projection that projects from the valve seat surface 51 to the valve body surface 41a along the axis A, and is formed so as to surround around the inlet 12a allowing fluid to flow in the valve chamber 14. Therefore, the inner peripheral side projection 52 and the outer peripheral side projection 53 come into contact with the valve body surface 41a, thereby blocking the inflow of the fluid from the introduction flow passage 12 to the valve chamber 14.

The elastic member 42 is disposed on the back surface of the diaphragm 41. Therefore, the diaphragm 41 in contact with the inner peripheral side projection 52 and the outer peripheral side projection 53 deforms along the shapes of the inner peripheral side projection 52 and the outer peripheral side projection 53 together with the elastic member 42. Accordingly, the generation of particles due to the contact between the valve seat surface 51 and the valve body surface 41a is prevented.

The valve seat part 50 has the endless inner peripheral side projection 52 and the endless outer peripheral side projection 53 that project from the valve seat surface 51 to the valve body surface 41a. Therefore, in the shut-off state, even in a case where particles are caught between one of the projections and the valve body surface 41a, and the shape of the projection deforms, the inflow of the fluid from the introduction flow passage 12 to the valve chamber 14 is blocked by the contact between the other projection and the valve body surface 41a. Accordingly, it is possible to prevent deterioration of a blocking property due to particles caught between the valve seat surface 51 and the valve body surface 41a.

In the shut-off valve 100 of this embodiment, the thickness of the diaphragm 41 is larger than the height of each of the inner peripheral side projection 52 and the outer peripheral side projection 53. With such a configuration, even in a case where contact and separation between the inner peripheral side projection 52 and the outer peripheral side projection 53 is repeated to deform the valve body surface 41a of the diaphragm 41, it is possible to suppress a risk that the inner peripheral side projection 52 and the outer peripheral side projection 53 break through and damage the valve body surface 41a of the diaphragm 41.

In the shut-off valve 100 of this embodiment, the moving mechanism 60 has the piston part 62 connected to the valve body part 40, and movable in the direction of the axis A together with the valve body part 40, the spring 70 (first urging force generation part) that generates elastic force in the direction, in which the valve body surface 41a approaches the valve seat surface 51, in the piston part 62, and the pressure chamber 22 (second urging force generation part) that generates pressure in the direction, in which the valve body surface 41a moves away from the valve seat surface 51, in the piston part 62.

According to the shut-off valve 100 of this embodiment, the elastic force in the direction, in which the valve body surface 41a approaches the valve seat surface 51, and the pressure in the direction, in which the valve body surface 41a moves away from the valve seat surface 51, generate in the piston part 62. In a case where the elastic force of the spring 70 exceeds the pressure of compressed air, the valve body surface 41a comes into contact with the valve seat surface 51, to enter the shut-off state shown in FIG. 1. In a case where the pressure of the compressed air exceeds the elastic force of the spring 70, the valve body surface 41a separates from the valve seat surface 51, to enter the circulation state shown in FIG. 8.

With such a configuration, the elastic force of the spring 70 and the pressure of the compressed air are regulated, so that the shut-off state and the circulation state can be suitably switched.

According to the shut-off valve 100 of this embodiment, the valve body part 40 has the intermediate member 44 connected to the piston part 62, and the intermediate member 44 is provided with the expanded diameter part 44a, and the reduced diameter part 44b whose radial width orthogonal to the axis A is narrower than the radial width of the expanded diameter part 44a, in the order from the tip side in the direction of the axis A. The diaphragm 41 has the locking part 41d that is in a state in contact with the reduced diameter part 44b in a state where the elastic member 42 is in contact with the valve body surface 41a and the tip of the intermediate member 44. The periphery of this locking part 41d is surrounded by the tip of the piston part 62.

With such a configuration, the presence of the tip of the piston part 62 surrounding the periphery of the locking part 41d restricts the deformation of the locking part 41d, which is in contact with the reduced diameter part 44b formed in the intermediate member 44, in the radial direction orthogonal to the axis A. Therefore, inconvenience in that the intermediate member 44 comes off the diaphragm 41 is prevented.

Second Embodiment

Now, a second embodiment of the present disclosure is described with reference to the drawings.

This embodiment is a modification of the first embodiment, and is similar to the first embodiment except the following case, particularly described below. Members similar to those of the first embodiment are denoted by the same reference numerals, and description thereof is omitted. While the shut-off valve 100 of the first embodiment is a normally closed shut-off valve, the shut-off valve 100' of this embodiment is a normally open shut-off valve.

Figure 9:
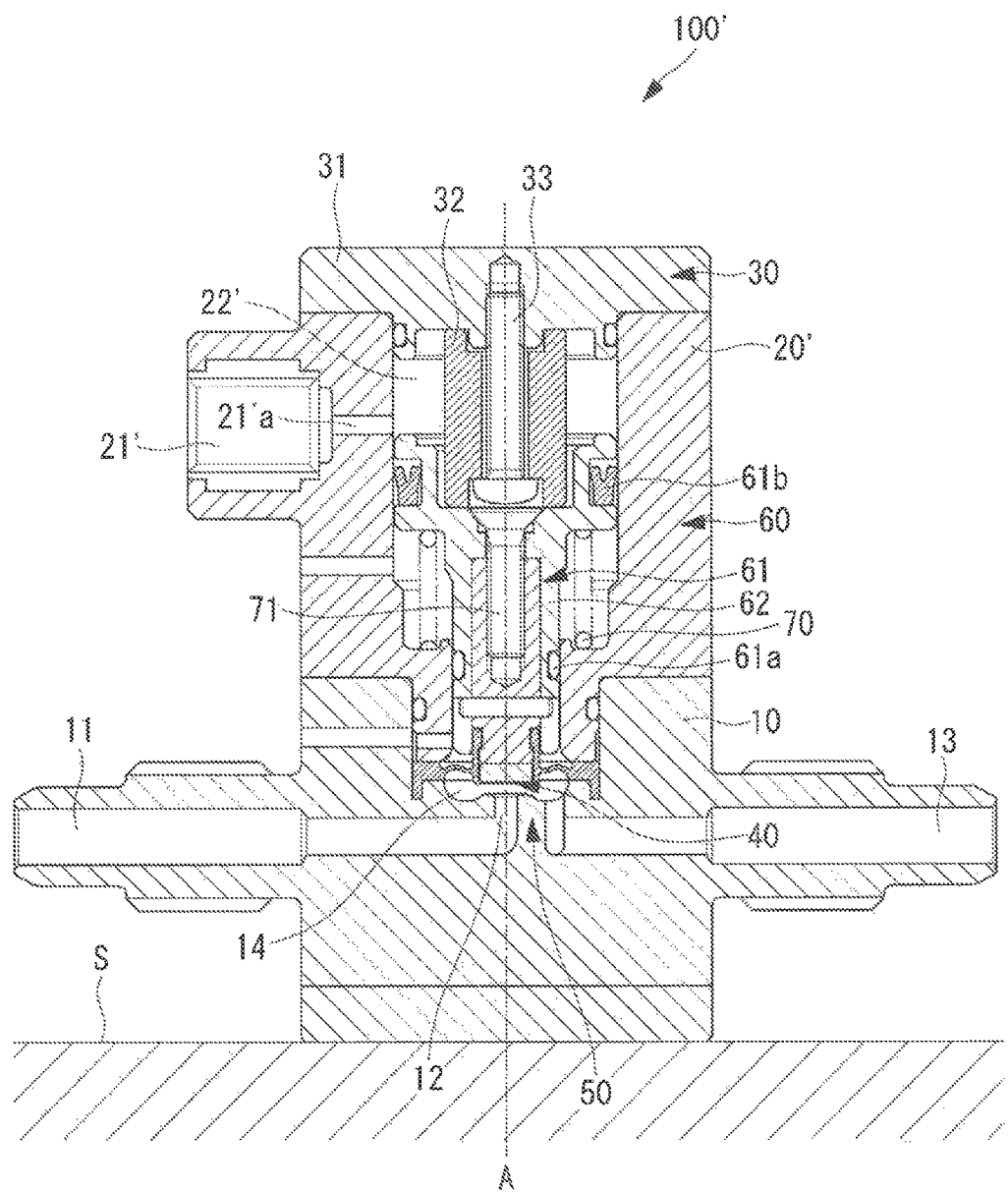
FIG. 9 is a longitudinal section view showing a circulation state of a shut-off valve of a second embodiment.

As shown in FIG. 9, the shut-off valve 100' of this embodiment includes an operation port 21' to which compressed air is supplied from a compressed air supply source, above an upper housing 20'. The shut-off valve 100' further includes a pressure chamber 22', to which compressed air is guided from the operation port 21' through an introduction flow passage 21'a, above the upper housing 20'.

A spring 70 generates elastic force in a direction, in which a valve body surface 41a of a valve body part 40 moves away from a valve seat surface 51 (second urging force), in a piston part 62. The upper end in the direction of an axis A of the spring 70 is supported by the piston part 62, and the lower end in the direction of the axis A of the spring 70 abuts on the upper housing 20'. Thus, elastic force of the spring 70 is transmitted to the piston part 62.

A pressure chamber 22' generates pressure in a direction, in which the valve body surface 41a approaches the valve seat surface 51 (first urging force), in the piston part 62. The pressure chamber 22' is a space defined by the piston part 62, the upper housing 20' and a cover part 30. In the pressure chamber 22', compressed air is introduced from the operation port 21' through the introduction flow passage 21'a.

Now, operation of switching between a circulation state where fluid is circulated and a shut-off state where circulation of the fluid is blocked, by the shut-off valve 100' of this embodiment is described.

The shut-off valve 100' of this embodiment is a normally open shut-off valve. In a normal state where the pressure of the compressed air in the pressure chamber 22' is low, elastic force of the spring 70 exceeds the pressure of the compressed air, and the shut-off valve 100' is brought into the circulation state shown in FIG. 9. On the other hand, the pressure of the compressed air in the pressure chamber 22 is increased, so that the circulation state shown in FIG. 9 is switched to the shut-off state (not shown). The pressure of the compressed air in the pressure chamber 22' is regulated by the compressed air supply source (not shown) that introduces compressed air in the operation port 21'.

As shown in FIG. 9, in a case where the elastic force of the spring 70 exceeds the pressure of the compressed air, the shut-off valve is brought into the circulation state where the valve body surface 41a separates from the valve seat surface 51. In this circulation state, fluid flows in a valve chamber 14 from an inlet 12a. On the other hand, in a case where the pressure of the compressed air exceeds the elastic force of the spring 70, the shut-off valve is brought into the shut-off state where the valve body surface 41a comes into contact with the valve seat surface 51. In this shut-off state, inflow of fluid from the inlet 12a to the valve chamber 14 is blocked.

As described above, in the shut-off valve 100' of this embodiment, the pressure of compressed air is increased, thereby generating pressure exceeding the elastic force of the spring 70 to switch the circulation state to the shut-off state. With such a configuration, the normally open shut-off valve 100' can be provided, in which in the normal state where the pressure of the compressed air is low, the elastic force of the spring 70 exceeds the pressure of the compressed air to enter the circulation state, and the circulation state is switched to the shut-off state by increasing the pressure of the compressed air.

Third Embodiment

Now, a third embodiment of the present disclosure is described with reference to the drawings.

This embodiment is a modification of the first embodiment, and is similar to the first embodiment except the following case, particularly described below. Members similar to those of the first embodiment are denoted by the same reference numerals, and description thereof is omitted. The shut-off valve 100" of this embodiment is different from the shut-off valve 100 of the first embodiment in that a flow regulating mechanism 90 capable of regulating a flow rate of fluid in a circulation state is provided.

Figure 10:
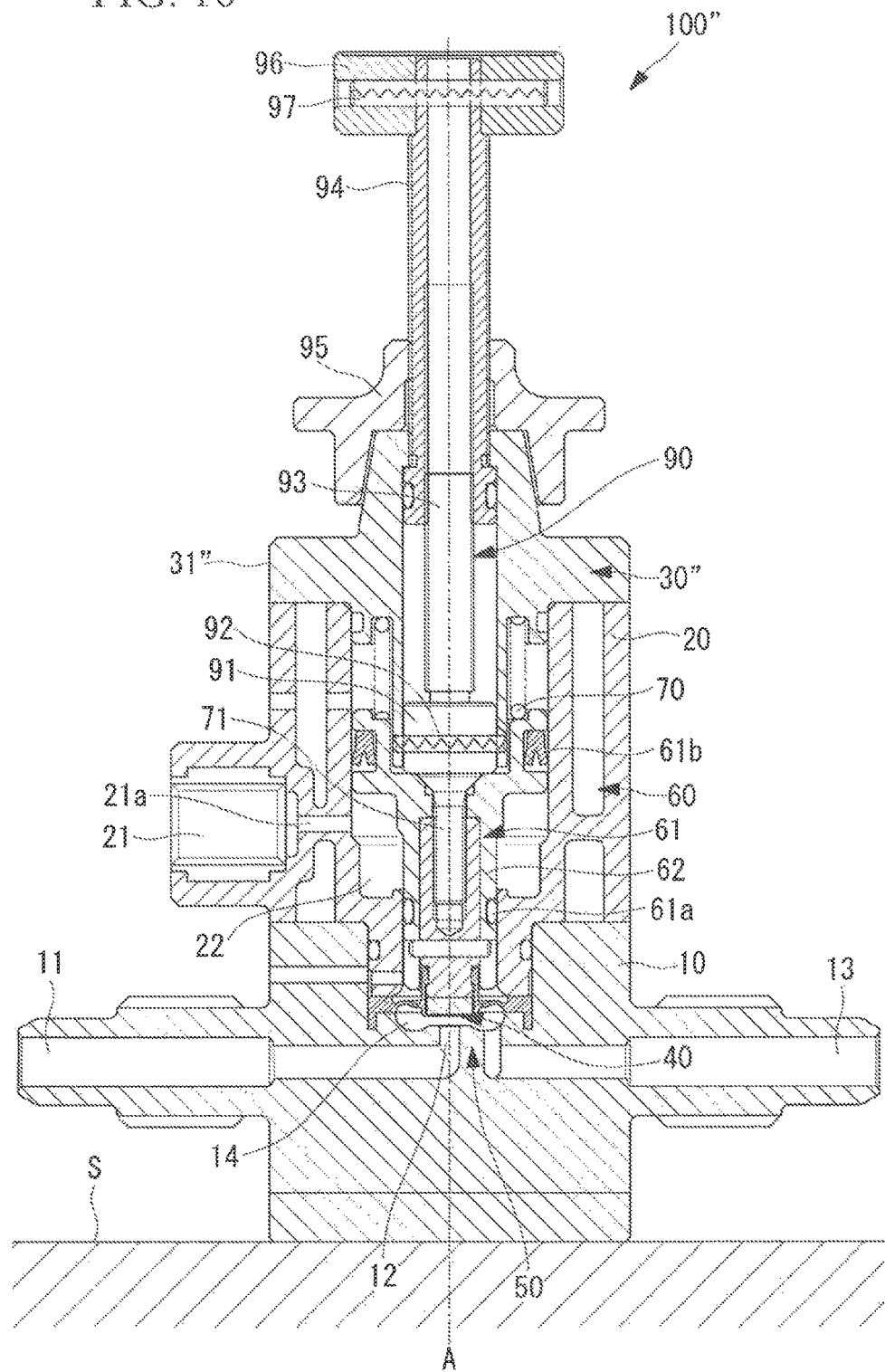
FIG. 10 is a longitudinal section view showing a shut-off state of a shut-off valve of a third embodiment.

The shut-off valve 100" shown in FIG. 10 is a normally closed shut-off valve. In a normal state where pressure of compressed air in a pressure chamber 22 is low, elastic force of a spring 70 exceeds the pressure of the compressed air, and the shut-off valve 100" is brought into a shut-off state. On the other hand, in the shut-off valve 100", the pressure of the compressed air in the pressure chamber 22 is increased, so that the shut-off state is switched to a circulation state shown in FIG. 10.

The flow regulating mechanism 90 is a mechanism that regulates a maximum separation distance when a valve body part 40 separates from a valve seat part 50 in the direction of an axis A by a moving mechanism 60. A flow rate of fluid circulating between the valve body part 40 and the valve seat part 50 is determined by the maximum separation distance when the valve body part 40 separates from the valve seat part 50. Accordingly, the maximum separation distance when the valve body part 40 separates from the valve seat part 50 is regulated by the flow regulating mechanism 90, thereby determining a flow rate of fluid in the shut-off valve 100" in the circulation state.

The flow regulating mechanism 90 includes a cylindrical member 91, a pin member 92, a first rod member 93, a second rod member 94, a lock nut 95, a flow regulating knob 96, and a pin member 97.

The cylindrical member 91 is a member disposed coaxially with the axis A, and is provided with a through hole that extends in a direction orthogonal to the axis A. In this through hole, the pin member 92 is inserted.

A cover 31" provided in a cover part 30" of this embodiment is a substantially cylindrical member that extends along the axis A, and is provided with a through hole having an inner peripheral surface whose diameter is substantially the same as the diameter of the outer peripheral surface of the cylindrical member 91. The through hole provided in the cover 31" of this embodiment extends in the direction of the axis A, as shown in FIG. 10. The cylindrical member 91 is movable in the direction of the axis A, in the through hole provided in the cover 31".

The pin member 92 that projects from the both ends of the through hole of the cylindrical member 91 is inserted in a pair of grooves along the axis A formed in the tip of the cover 31". Therefore, rotation of the cylindrical member 91 around the axis A inside the through hole provided in the cover 31" is restricted.

The pin member 92 that projects from the both ends of the through hole of the cylindrical member 91 is inserted in a pair of grooves along the axis A formed in the tip of the cover 31". Therefore, rotation of the cylindrical member 91 around the axis A inside the through hole provided in the cover 31" is restricted. The first rod member 93 is a shaft-like member that extends along the axis A, and is provided with a male screw in the outer peripheral surface. The first rod member 93 and the cylindrical member 91 are integrally formed.

The second rod member 94 is a substantially cylindrical member that extends along the axis A, has an inner peripheral surface provided with a female screw, and an outer peripheral surface provided with a male screw. The female screw on the inner peripheral surface of the second rod member 94 is connected to the male screw on the outer peripheral surface of the first rod member 93. Additionally, the male screw on the outer peripheral surface of the second rod member 94 is connected to a female screw formed on the upper end of the through hole of the cover 31", and a female screw formed on the inner peripheral surface of the lock nut 95.

The lock nut 95 is a member for fixing a position in the direction of the axis A of the cylindrical member 91 so as not to change the position. The lock nut 95 is rotated, and is fastened such that the lower surface of the lock nut 95 and the upper surface of the cover 31" adhere to each other, thereby fixing the position in the direction of the axis A of the cylindrical member 91.

The flow regulating knob 96 is a substantially cylindrical member that is rotated around the axis A by operation of an operator. The flow regulating knob 96 is provided with a through hole extending in a horizontal direction orthogonal to the axis A, in which the pin member 97 is inserted. Additionally, the flow regulating knob 96 is provided with a through hole extending along the axis A, in which the end of the second rod member 94 is inserted.

The pin member 97 is inserted in the through hole of the flow regulating knob 96, which extends in the horizontal direction, and a horizontal through hole formed on the end of the second rod member 94. The flow regulating knob 96 and the second rod member 94 are connected by the pin member 97, and therefore the flow regulating knob 96 is rotated around the axis A, thereby rotating the second rod member 94 around the axis A.

Herein, a pitch of the female screw formed on the inner peripheral surface of the second rod member 94 (distance between screw valleys in the direction of the axis A) coincides with a pitch of the male screw formed on the outer peripheral surface of the first rod member 93 (distance between screw threads in the direction of the axis A), and each of these pitches is a pitch A. On the other hand, a pitch of the male screw formed on the outer peripheral surface of the second rod member 94 (distance between screw threads in the direction of the axis A) coincides with a pitch of the female screw formed on the upper end of the through hole of the cover 31" (distance between screw valleys in the direction of the axis A), and each of these pitches is a pitch B.

The relation between the pitch A and the pitch B is pitch A<pitch B. Accordingly, when the flow regulating knob 96 is rotated around the axis A once such that the second rod member 94 moves downward along the axis A, the second rod member 94 moves downward along the axis A by a distance B. On the other hand, the first rod member 93 moves upward along the axis A relative to the second rod member 94 by a distance A as the second rod member 94 rotates around the axis A once. Accordingly, when the second rod member 94 is rotated around the axis A once, the first rod member moves downward along the axis A by a distance (B-A).

The cylindrical member 91 is formed integrally with the first rod member 93, and therefore moves downward along the axis A by the distance (B-A) that is a difference between the pitch B of the outer peripheral surface of the second rod member 94 and the pitch A of the inner peripheral surface of the second rod member 94. The reason why the cylindrical member 91 moves downward by the distance (B-A) as described above is that the pitch A of the inner peripheral surface of the second rod member 94 is smaller than the pitch B of the outer peripheral surface of the second rod member 94, and the cylindrical member 91 does not rotate around the axis A relative to the cover 31" by the pin member 92.

Similarly, when the first rod member 93 moves upward along the axis A by a distance B, the cylindrical member 91 moves upward along the axis A by the distance (B-A) that is the difference between the pitch B of the outer peripheral surface of the second rod member 94 and the pitch A of the inner peripheral surface of the second rod member 94. The reason why the cylindrical member 91 moves upward by the distance (B-A) as described above is that the pitch A of the inner peripheral surface of the second rod member 94 is smaller than the pitch B of the outer peripheral surface of the second rod member 94, and the cylindrical member 91 does not rotate around the axis A relative to the cover 31" by the pin member 92.

As described above, the male screw formed on the outer peripheral surface of the second rod member 94 is made different in pitch from the female screw formed on the inner peripheral surface. With such a configuration, a moving amount of the cylindrical member 91 relative to the rotation of the flow regulating knob 96 is reduced and fine regulation of a moving amount of the cylindrical member 91 is possible. Then, the position of the cylindrical member 91 is regulated by the rotation of the flow regulating knob 96, thereby regulating the maximum separation distance when the valve body part 40 separates from the valve seat part 50 in the direction of the axis A.

Now, a fastening structure of fastening a lower housing 10, an upper housing 20 and the cover part 30" of the shut-off valve 100" is described.

Figure 11A:
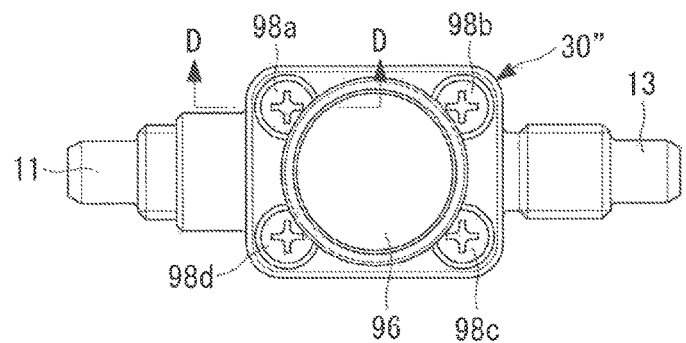
FIG. 11A is a plan view.
Figure 11B:
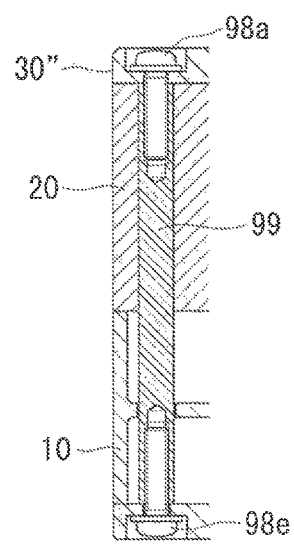
FIG. 11B is a sectional view taken along the arrow D-D of FIG. 11A.
Figure 11C:
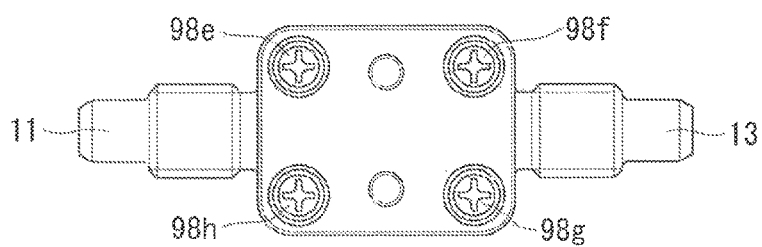
FIG. 11C is a rear view.

As shown in FIG. 11A and FIG. 11C, the lower housing 10, the upper housing 20, and the cover part 30" each are a substantially rectangular member in plan view, and are each provided with through holes extending in a direction parallel to the axis A at four corners.

In the four through holes, each of which passes through the lower housing 10, the upper housing 20, and the cover part 30", shaft materials 99 whose diameters are substantially the same as the diameters of the through hole are inserted. Each of the shaft members has both ends provided with fastening holes provided with female screws on inner peripheral surfaces. To the respective fastening holes, fastening bolts 98*a*, 98*b*, 98*c* and 98*d* provided with male screws on outer peripheral surfaces are fastened from the cover part 30" side. On the other hand, to the respective fastening holes, fastening bolts 98*e*, 98*f*, 98*g* and 98*h* provided with male screws on outer peripheral surfaces are fastened from the lower housing 10 side.

The shaft materials 99 are desirably formed by stainless materials such as SUS403. The shaft materials 99 are formed by stainless materials, so that it is possible to suppress change in the lengths of the shaft materials 99 due to the temperature of fluid circulating in the shut-off valve 100".

In this embodiment, as shown in FIG. 11B, the lower housing 10, the upper housing 20, and the cover part 30" are connected by the shaft materials 99 disposed so as to pass through the lower housing 10, the upper housing 20, and the cover part 30". Then, the shaft materials are formed by the stainless materials, so that it is possible to suppress change in a flow rate of fluid in the circulation state due to the deformation of the shut-off valve 100" resulting from the temperature of fluid circulating in the shut-off valve 100".

Thus, the fastening structure of this embodiment suitably suppresses the deformation of the shut-off valve 100" resulting from the temperature of the fluid circulating in the shut-off valve 100". Such a fastening structure is applied to the shut-off valve 100" of this embodiment including the flow regulating mechanism 90 capable of regulating a flow rate of the fluid in the circulation state, so that it is possible to suitably suppress fluctuation of the flow rate of the fluid due to the temperature of the fluid.

As described above, according to the shut-off valve 100" of this embodiment, the maximum separation distance when the valve body part 40 separates from the valve seat part 50 can be regulated by the flow regulating mechanism 90. The maximum separation distance when the valve body part 40 separates from the valve seat part 50 is regulated, and thereby determining a flow rate of fluid in the shut-off valve 100" in the circulation state. Therefore, according to the shut-off valve 100" of this embodiment, it is possible to regulate the flow rate of the fluid in the circulation state.

Other Embodiments

The present invention is not limited to the above embodiments, and can be appropriately changed and modified without departing from the scope of the present invention.

The invention claimed is:

1. A shut-off valve comprising:
   a valve body part that moves along an axis inside a valve chamber, and has a valve body surface formed on a plane orthogonal to the axis;
   a valve seat part provided around an inlet that allows fluid to flow in the valve chamber along the axis, and having a valve seat surface located at a position opposite to the valve body surface; and
   a moving mechanism that is connected to the valve body part, and moves the valve body part in a direction of the axis to switch to either a shut-off state where the valve body surface comes into contact with the valve seat surface, or a circulation state where the valve body surface separates from the valve seat surface, wherein
   the valve seat part has a plurality of annular projections that project from the valve seat surface toward the valve body surface along the axis, and are formed so as to surround the inlet, and
   the valve body part has a diaphragm forming the valve body surface, and an elastic member disposed on a back surface of the diaphragm, the diaphragm being a thin-film member made of resin, the elastic member being formed by rubber, the valve body part has an intermediate member connected to the moving mechanism and the diaphragm, the intermediate member is provided with an expanded diameter part, and a reduced diameter part whose radial width orthogonal to the axis is narrower than that of the expanded diameter part, in this order starting from a side of a tip in the direction of the axis, the diaphragm has a locking part that is in a state in contact with the reduced diameter part in a state where the elastic member is in contact with the valve body surface and the tip of the intermediate member, and the elastic member is located in a state of being in contact with the intermediate member and supports the back surface of the diaphragm.

2. The shut-off valve according to claim 1, wherein a thickness of the diaphragm is larger than a height of each of the projections.

3. The shut-off valve according to claim 1, wherein the moving mechanism has:
   a piston part that is connected to the valve body part, and is movable in the direction of the axis together with the valve body part;
   a first urging force generation part that generates first urging force in the piston part, the first urging force being force in a direction in which the valve body surface approaches the valve seat surface; and
   a second urging force generation part that generates second urging force in the piston part, the second urging force being force in a direction in which the valve body surface moves away from the valve seat surface, and
the valve body surface comes into contact with the valve seat surface to enter the shut-off state in a case where the first urging force exceeds the second urging force, and the valve body surface separates from the valve seat surface to enter the circulation state in a case where the second urging force exceeds the first urging force.

4. The shut-off valve according to claim 3, wherein the first urging force generated by the first urging force generation part is elastic force of a spring,
the second urging force generated by the second urging force generation part is pressure of compressed air, and
the second urging force generation part generates the second urging force exceeding the first urging force to switch the shut-off state to the circulation state, by increasing the pressure of the compressed air.

5. The shut-off valve according to claim 3, wherein
the first urging force generated by the first urging force generation part is pressure of compressed air,
the second urging force generated by the second urging force generation part is elastic force of a spring, and
the first urging force generation part generates the first urging force exceeding the second urging force to switch the circulation state to the shut-off state, by increasing the pressure of the compressed air.

6. The shut-off valve according to claim 3, further comprising
a flow regulating mechanism that regulates a flow rate of fluid in the circulation state.

7. A shut-off valve comprising:
a valve body part that moves along an axis inside a valve chamber, and has a valve body surface formed on a plane orthogonal to the axis;
a valve seat part provided around an inlet that allows fluid to flow in the valve chamber along the axis, and having a valve seat surface located at a position opposite to the valve body surface; and
a moving mechanism that is connected to the valve body part, and moves the valve body part in a direction of the axis to switch to either a shut-off state where the valve body surface comes into contact with the valve seat surface, or a circulation state where the valve body surface separates from the valve seat surface, wherein
the valve seat part has a plurality of annular projections that project from the valve seat surface toward the valve body surface along the axis, and are formed so as to surround the inlet,
the moving mechanism has a piston part that is connected to the valve body part, and is movable in the direction of the axis together with the valve body part,
the valve body part has a diaphragm forming the valve body surface, an elastic member disposed on a back surface of the diaphragm, and an intermediate member connected to the piston part,
the intermediate member is provided with an expanded diameter part, and a reduced diameter part whose radial width orthogonal to the axis is narrower than that of the expanded diameter part, in this order starting from a side of a tip in the direction of the axis,
the diaphragm has a locking part that is in a state in contact with the reduced diameter part in a state where the elastic member is in contact with the valve body surface and the tip of the intermediate member, and
a periphery of the locking part is surrounded by a tip of the piston part.

* * * * *